United States Patent Office 2,845,277
Patented July 29, 1958

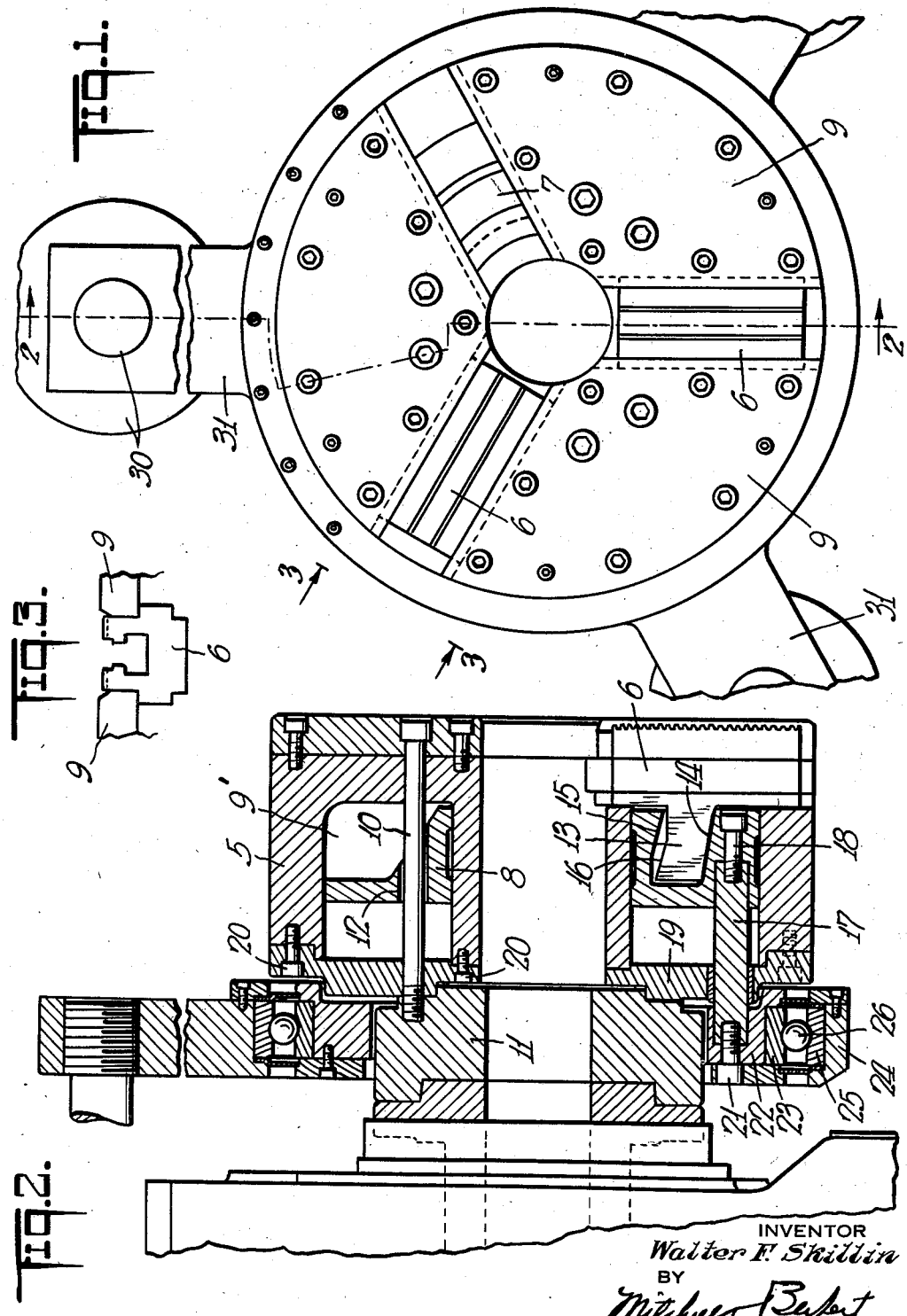

2,845,277

CHUCK

Walter F. Skillin, New Britain, Conn., assignor to Union Manufacturing Company, New Britain, Conn., a corporation of Connecticut Application May 23, 1955, Serial No. 510,126

7 Claims. (Cl. 279—121)

My invention relates to a chuck and, more particularly, to an improved power chuck.

Reference is made herein to my copending applications, Serial Nos. 510,124 and 510,125 both filed on even date herewith.

It is an object of the invention to provide a chuck having an improved means for actuating the chuck jaws. Another object is to provide a chuck which may be actuated by improved power means at the outside of the chuck while the chuck is either in rotation or stopped.

It is another object to provide an improved chuck which is simple in construction and effective in use.

Other objects and features of invention will be hereinafter pointed out or will become apparent to those skilled in the art.

Briefly stated, in a preferred form of the invention, my improved chuck includes a chuck body having a plurality of jaws movable radially thereon. The jaws are preferably moved by an actuator within the body and coacting means between the actuator and the jaws for wedging the latter into chucking and unchucking positions. The wedging means may be actuated by pilot pins or pushers extending through the chuck and carried at the outside by a ring which is rotatable with the chuck during its rotation. There is a second ring concentric with the first ring at the outside of the body and anti-friction bearing members are interposed between the two rings, which bearing members serve to cause the two rings to move axially more or less together. That is to say, the two rings have little or no relative axial movement. The second ring is actuated preferably by power means which may be in the form of fluid-actuated piston and cylinder means carried by the machine frame.

In the drawings, which show for illustrative purposes only, a preferred form of the invention:

Fig. 1 is a view in front elevation of one form of my improved chuck;

Fig. 2 is a sectional view taken substantially in the plane of the line 2—2 of Fig. 1; and Fig. 3 is a fragmentary detail view in elevation taken substantially in the plane of the line 3—3 of Fig. 1.

In the form shown, the chuck includes a chuck body 5 which carries a plurality of master jaws 6, to which false jaws such as 7 may be secured, as will be understood. These jaws, in the form shown, are slidable radially in ways of more or less usual construction of the chuck body. The jaws are moved radially, preferably by wedging means which may include a piston-like actuator 8 which may fit or slide in a cylinder-like chamber 9' in the chuck body. This chamber 9' is open to the lower side of the chuck jaws, as will be plain in Fig. 2, and the jaws are held down by the front plate or sectors 9 thereof forming part of the ways heretofore referred to and shown particularly in Fig. 3.

Means such as screws 10 may secure the chuck body to a spindle nose or an adapter 11, and in the form illustrated these screws 10 pass through guide openings 12 in the piston-like actuator 8 so as to hold the same against rotation in the cylinder. The jaws and piston-like actuator 8 have coacting wedging or camming means, and in the form illustrated each jaw has a camming or wedging projection 13 extending rearwardly therefrom and the actuator 8 has coacting camming surfaces to coact with corresponding surfaces on the wedging projections 13. In the form shown, the projection 13 and the actuator 8 have coacting camming surfaces 14 arranged at such an angle that, when the actuator 8 is moved forwardly, the coacting surfaces 14 engage each other and cam or wedge the jaws 6 radially inwardly. The rearward movement of the actuator 8 will cause the surfaces 14 to separate and the cam or wedge surface 15 on the actuator will engage a cam or wedge surface 16 on the projection 13 so as to retract the jaws, as will be understood.

The projections 13 and the openings defining the wedge surfaces in the actuator 8 may be each or both of generally cylindrical form and the actuating or wedging surfaces may be parts of cylinders, or these elements and surfaces may be flat surfaces. While the projections 13 and the openings for receiving the same are each shown as being in one piece, it is to be understood that for ease of manufacture the projections 13 may be formed in several pieces secured to the jaws and the actuator 8 may also be formed in several pieces secured together. It will be seen, therefore, that generally axial movement of the actuator 8 will cause the jaws 6 to be cammed or wedged radially in or out. The surfaces 14 are preferably, though not necessarily, at a locking or very sticky angle, so that when the work piece is gripped by the jaws such surfaces are not likely to come apart so as to cause the jaws to loosen up on the piece being held.

The actuator 8 is moved axially in the chuck body by suitable means such as pilot pins 17 or the like, which may be fastened at the inner ends to the actuator 8 by means such as the screws 18. The pins preferably extend through guide bores in the back plate 19, which is secured to the chuck body and serves to close the cylinder-like chamber 9. The back plate may be held on the body by means of screws 20—20, as will be understood. The pilot pins or pushers 17 at the rear end are preferably secured as by means of screws 21 to a ring 22, which may carry or form part of an anti-friction bearing ring 23. There is a second concentric ring 24, which may form part of an anti-friction bearing ring 25. Anti-friction bearing members such as balls 26 are interposed between the two rings 22—24. These balls or other suitable anti-friction bearing members may hold the rings against substantial axial relative movement so that axial movement of one of the rings will cause corresponding axial movement of the other ring. The rings are provided with the usual seals or shields for the bearings, as will be understood.

One of the concentric rings, that is the one not carrying the pilot pins 17, is moved by power means, preferably in the form of fluid-pressure actuated piston and cylinder means 30. Such piston and cylinder means may be so arranged as to provide a balanced force on the ring 24, which ring, as will be clear, has the projections 31 for engagement with the piston and cylinder means referred to.

It will be seen that when the ring 24 is moved axially by means of the power means, such as piston and cylinder means, the anti-friction bearing members will carry the ring 22 axially back and forth with the ring 24. Rearward movement of the rings will pull on the pilot pins 17 and cause the wedge surfaces 15—16 to engage each other and open up the chuck jaws. Forward movement will cause the pins 17 to force the actuator 8 in a forward direction, so as to engage the surfaces 14 and urge the jaws inwardly in chucking direction. It will be seen that, due to the anti-friction bearing members interposed between the rings 22—24, the force of the fluid pressure actuated piston and cylinder means may be maintained while the chuck is in rotation as well as when the chuck is stationary. Therefore it may not always be necessary to have the surfaces 14 at a locking angle since actual chucking pressure may be maintained during the rotation of the chuck.

It will be seen that the center of the chuck is quite unobstructed and may accommodate parts of the work piece being operated on. All of the parts are rather simple in construction and the finished chuck is efficient in operation.

While the invention has been described in considerable detail and a preferred form illustrated, it is to be understood that various changes and additions may be made within the scope of the invention as defined in the appended claims.

I claim:

1. In a chuck, a chuck body, a plurality of chuck jaws movable on said body, chuck actuating means in said body and coacting with said jaws for moving the latter, means projecting into said body and carried by a ring at the outside of said body for actuating said jaw actuator in said body, a ring surrounding said first-mentioned ring, means for moving said second ring, and anti-friction bearing members interposed between said rings.

2. In a chuck, a chuck body, a plurality of chuck jaws movable on said body, means for moving said jaws on said body and extending to the outside thereof, said last-mentioned means being carried by a ring at the outside of said body, said ring being rotatable with said chuck body, a second and non-rotatable ring surrounding said first ring, power means for moving said second ring in a direction generally axially of said body, and anti-friction bearing members interposed between said rings for holding said rings together whereby axial movement of said second ring will cause axial movement of said first ring.

3. In a chuck, a chuck body, a plurality of chuck jaws movable on said body, a pair of concentric rings at the outside of said body, one of said rings being non-rotatable, means for moving said ring in a generally axial direction, anti-friction bearing members interposed between said rings whereby movement axially as aforesaid will cause axial movement of the other ring, and means connecting said other ring and said jaws for moving the latter.

4. In a chuck, a chuck body, a plurality of chuck jaws movable on said body, a plurality of pilot pins extending rearwardly through said body and actuating means for moving said jaws radially upon axial movement of said pilot pins, a ring at the outside of said body and secured to said pilot pins whereby axial movement of said ring will cause axial movement of said pilot pins, a second ring surrounding said first-mentioned ring, anti-friction bearing members interposed between said rings and serving to hold both of said rings against substantial axial relative movement and means for moving said second ring generally axially whereby said first-mentioned ring is moved axially and said pilot pins are moved axially and said jaws are moved radially.

5. In a chuck, a chuck body, a plurality of chuck jaws movable on said body, a cylinder-like chamber in said body, a piston-like actuator in said chamber, coacting wedging means between said jaws and said piston-like actuator whereby axial movement of said actuator will wedge said jaws radially, a ring, connecting means between said ring and said actuator, a second ring, anti-friction bearing members interposed between said rings, and means for moving said second ring axially whereby said anti-friction bearing members will cause said first-mentioned ring to move axially.

6. In a chuck, a chuck body, said body having a cylinder therein, a plurality of jaws movable radially on said body, a piston member in said cylinder, said piston member and jaws having coacting wedging surfaces to wedge said jaws radially upon axial movement of said piston member, a ring at the rear of said chuck body, pilot pins extending through the rear of said chuck body and secured at the inner ends to said piston member and at the outer ends to said ring, a second ring concentric with said first ring, antifriction bearing members interposed between said rings and locking said rings against axial separation, and power means for moving said second ring axially to move said piston axially and said jaws radially.

7. In a chuck, a chuck body, a plurality of jaws movable radially on said body, chuck jaw moving means movable in an axial direction and cooperable with said jaws for moving the latter radially, said means extending rearwardly of said chuck body, a pair of rings at the rear of said chuck body and surrounding a part of the rear thereof, one of said rings being operatively secured to said chuck jaw moving means, power means for moving the other of said rings in an axial direction, and means for coupling said rings to cause one to move with the other in at least one direction axially.

References Cited in the file of this patent

UNITED STATES PATENTS

| | | |
|---|---|---|
| 1,786,147 | Bullard | Dec. 23, 1930 |
| 2,383,156 | Phillips | Aug. 21, 1945 |
| 2,436,848 | Benjamin et al. | Mar. 2, 1948 |
| 2,597,280 | Barnes | May 20, 1952 |

FOREIGN PATENTS

| | | |
|---|---|---|
| 184,335 | Great Britain | Aug. 17, 1922 |